(12) United States Patent
Evans et al.

(10) Patent No.: US 9,359,901 B2
(45) Date of Patent: Jun. 7, 2016

(54) AEROFOIL ASSEMBLY

(75) Inventors: Dale E Evans, Derby (GB); Ian C D Care, Derby (GB)

(73) Assignee: ROLLS-ROYCE plc, London (GB)

( * ) Notice: Subject to any disclaimer, the term of this patent is extended or adjusted under 35 U.S.C. 154(b) by 913 days.

(21) Appl. No.: 13/591,751

(22) Filed: Aug. 22, 2012

(65) Prior Publication Data

US 2013/0064661 A1    Mar. 14, 2013

(30) Foreign Application Priority Data

Sep. 8, 2011   (GB) .................................. 1115485.3

(51) Int. Cl.
| | | |
|---|---|---|
| *F01D 5/14* | (2006.01) | |
| *F01D 9/02* | (2006.01) | |
| *F01D 25/00* | (2006.01) | |
| *F02C 7/24* | (2006.01) | |

(52) U.S. Cl.
CPC ........ *F01D 5/147* (2013.01); *F01D 9/02* (2013.01); *F01D 25/005* (2013.01); *F02C 7/24* (2013.01); *F05D 2260/963* (2013.01)

(58) Field of Classification Search
CPC ............. F01D 9/00; F01D 9/02; F01D 25/00; F01D 25/04; F01D 25/08
See application file for complete search history.

(56) References Cited

U.S. PATENT DOCUMENTS

| 4,594,761 | A  |   | 6/1986  | Murphy et al. |
|---|---|---|---|---|
| 6,039,542 | A  | * | 3/2000  | Schilling ................... F01D 5/16 416/224 |
| 7,189,064 | B2 | * | 3/2007  | Helder et al. ................. 416/232 |
| 7,549,506 | B2 | * | 6/2009  | Sattinger ...................... 181/213 |
| 7,980,817 | B2 | * | 7/2011  | Foose et al. ................... 415/191 |
| 2005/0254955 | A1 |   | 11/2005 | Helder et al. |
| 2008/0072569 | A1 |   | 3/2008  | Moniz et al. |
| 2008/0159851 | A1 |   | 7/2008  | Moniz et al. |
| 2010/0209235 | A1 |   | 8/2010  | Shim et al. |

OTHER PUBLICATIONS

Nov. 28, 2011 British Search Report issued in British Application No. GB1115485.3.

* cited by examiner

*Primary Examiner* — Nathaniel Wiehe
*Assistant Examiner* — Cameron Corday
(74) *Attorney, Agent, or Firm* — Oliff PLC

(57) ABSTRACT

This invention relates to a stator aerofoil for a gas turbine engine, comprising: a body portion; at least one panel which forms at least part of one of either the pressure or section surface of the aerofoil; at least one internal chamber which is bounded by the body portion and panel; and, at least one elastomeric component within the at least one internal chamber, wherein the elastomeric component at least partially defines a cell within the internal chamber, wherein the cell is in fluid communication with the exterior of the aerofoil.

14 Claims, 4 Drawing Sheets

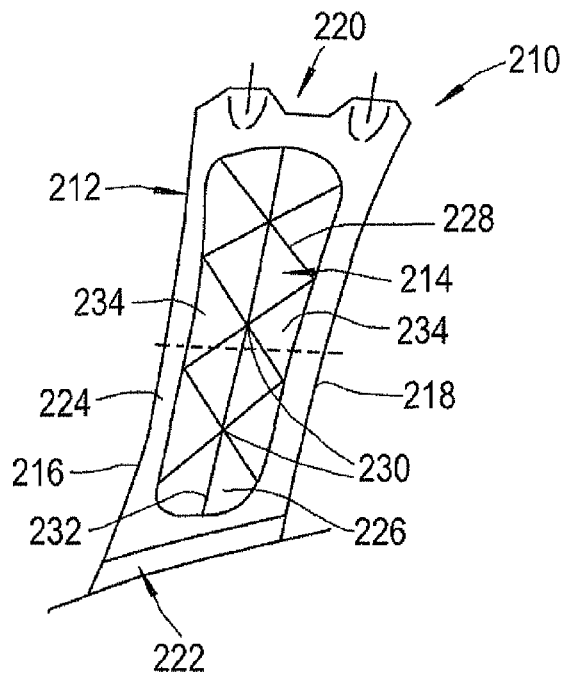
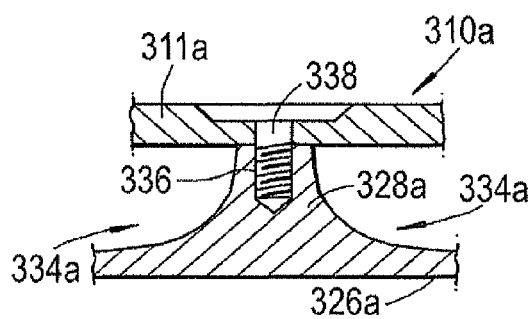
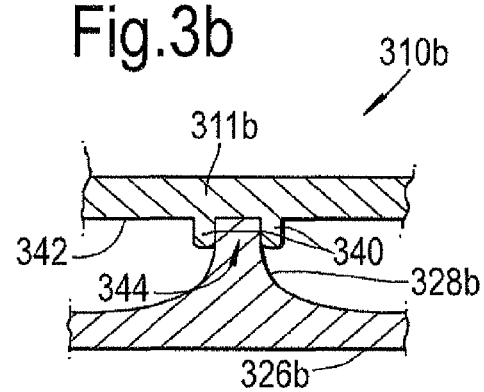
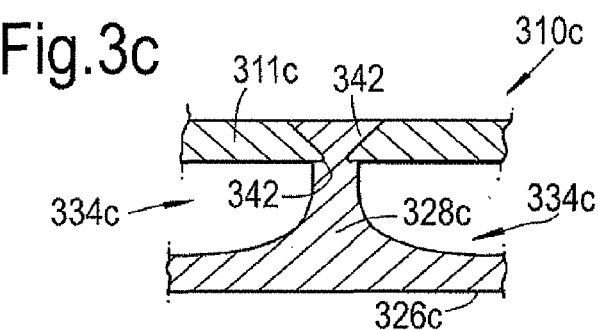

AEROFOIL ASSEMBLY

This invention relates to an aerofoil for a gas turbine engine. In particular, this invention relates to a low weight aerofoil which includes an elastomeric component.

It is an ongoing objective for engineers to design lightweight components for aero engines. One particular component which has received recent attention is the outlet guide vanes which are placed behind the fan in a high bypass gas turbine aero engine. As is well known in the art, these components are relatively large in state of the art commercial engines and lend themselves well to having a reduced weight construction.

US2008159851 describes an outlet guide vane which includes a metallic frame which defines the leading and trailing edges. A cavity is defined within the frame between the leading edge and trailing edge in which a honeycomb structured filler is sandwiched between two externally facing skins. The skins are made from a composite.

US2008072569 describes a method for fabricating a gas turbine engine outlet guide vane which includes fabricating an airfoil having a leading edge portion and a trailing edge portion, each fabricated from a first material, and installing a filler portion between the leading and trailing edge portions. The filler portion is fabricated from a second material that is lighter than the first material.

US2010209235 describes an outlet guide vane including a frame having a first side and a second side and a radially inward flange coupled to a radially outward flange by a leading edge. The trailing edge is coupled to the radially inward flange and the radially outward flange aft of the leading edge. A cavity is defined between the radially inward flange, the radially outward flange, the leading edge, and the trailing edge. A first and a second mating surface circumscribe the cavity on the first and second sides respectively. A filler portion is provided within the cavity which includes a third side and a fourth side, coupling a first skin to the third side and the first mating surface, and coupling a second skin to the fourth side and the second mating surface, wherein at least one of the first skin and the second skin are fabricated from a composite material.

US2005254955 describes an outlet guide vane assembled from a body having at recessed pocket formed therein, and an aerodynamic cover bonded over the pocket. Both the cover and the body are constructed from materials which are not readily fusion weldable. The cover is attached to the body by a solid state bonding process, for example friction stir welding. US'955 describes the use of a filler within the pocket to increase structural rigidity of the outlet guide vane.

However, none of the above documents significantly consider noise reduction aspects, internal cell pressures, and water ingress control.

The present invention seeks to provide an improved aerofoil for a gas turbine engine.

In a first aspect, the present invention provides a stator aerofoil for a gas turbine engine, comprising: a body portion; at least one panel which forms at least part of one of either the pressure or section surface of the aerofoil; at least one internal chamber which is bounded by the body portion and panel; and, at least one elastomeric component within the at least one internal chamber, wherein the elastomeric component at least partially defines a cell within the internal chamber and wherein the cell is in fluid communication with the exterior of the aerofoil.

Having an elastomeric component within an internal chamber of an aerofoil which has a body and panel construction has several advantages. For example, the elastomeric member may be used to provide mechanical damping or as a pressure baffle which can help equalise a pressure differential between the internal chamber and the exterior of the aerofoil.

The aerofoil may be a guide vane. The aerofoil may be an outlet guide vane. The panel may be made from a light weight material such as a polymer. The polymer may be homogeneous or may be a composite of different materials. The polymer may be fibre reinforced. The polymer may be a thermosetting plastic. The panel may be made from a material which may be injection moulded. The polymer may be a chopped fibre reinforced plastic such as Stanyl™.

There may be a plurality of cells within an internal chamber. At least one cell may be formed within the elastomeric component. That is, the elastomeric component may include a hollow portion having walls which define the cell. Alternatively, an external wall of the elastomeric component may bound at least part of a cell. In one embodiment, there may be a cell within the elastomeric component and a cell bounded by an external wall of the elastomeric component. The elastomeric component may be resiliently deformable so as to allow its shape may change through a flight cycle.

The elastomeric component may abut the panel and body portion. The elastomeric component may be located around the periphery of the cell.

The cell may be in fluid communication with the exterior of the aerofoil.

An external wall of the elastomeric component may define a sealed cell within the internal chamber, sealed being relative the exterior of the aerofoil. The elastomeric component may resiliently deflectable so as to act as a pressure baffle to account for a pressure differential between the sealed cell and the exterior of the aerofoil.

The fluid communication may be via at least one aperture which is configured to act in conjunction with the cell to provide a Helmholtz resonator. The Helmholtz resonator may be configured to resonate at frequencies typically experienced in an aeroengine. For example, the Helmholtz resonator may be configured to resonate in a frequency range to damp out blade passing frequency or, for larger cells, to damp out vibration between the OGV and fan interference. As will be appreciated, these frequencies are dependent upon blade and vane numbers, engine diameter, and normal engine running speeds.

The aperture may pass through the panel. The aperture may extend from the external gas washed surface of the panel into the cell. When the cell is defined within the elastomeric component, the aperture may pass through a wall of the elastomeric component.

The minimum diameter, length of the aperture, and the volume of the cell will affect the resonant frequency of the Helmholtz cell. Hence, the aperture may pass through a tubular portion which extends from the panel. The tubular portion may extend from the panel at an angle to perpendicular. The angle may be chosen to minimise distruption to boundary layer flow and reduce the ingress of foreign matter in the cell. The angle may be perpendicular to the surface, i.e. normal to the local surface tangent. The angle may be between the normal to the local surface tangent to approximately 88 degrees out of normal use flow. The angle may, in a preferable embodiment, be between 30 and 60 degrees. The tube may include one or more bent portions. The tubular portion may be helical or a spiral. The tube may be attached to the interior surface of the panel.

The aperture passing through the panel may have multiple diameters. For example, the aperture may have a first portion having a first diameter extending away from the gas washed surface, and a second portion adjoining the first portion which has a second diameter. The second diameter may be greater than the first diameter.

The aperture may be towards the lower portion of the chamber when in use so as to provide a drainage hole for water which has collected within the internal chamber or cell. There may be multiple apertures to allow for different positions of the OGV within an annular array. The collection may be via condensation.

The body portion includes a plurality of ribs which define a plurality of internal chambers within the body portion. The ribs can be arranged to provide a plurality of polygonal internal chambers. The internal chambers may have different volumes.

The panel may extend across multiple ribs to define multiple chambers.

The edge of the panel is located within a re-entrant feature of the body portion. The panel may include location features. The location features may provide a channel in which one of the ribs is located in use. The location features may include a two part interlock. The two parts may be corresponding male and female parts.

Embodiments of the present invention will now be described with the aid of the following figures in which:

FIG. 2 shows a side view of an outlet guide vane frame according to a first embodiment of the present invention.

FIG. 3a-c show various cross sections detailing the mounting of a panel on the outlet guide vane frame shown in FIG. 2.

Figure 4:
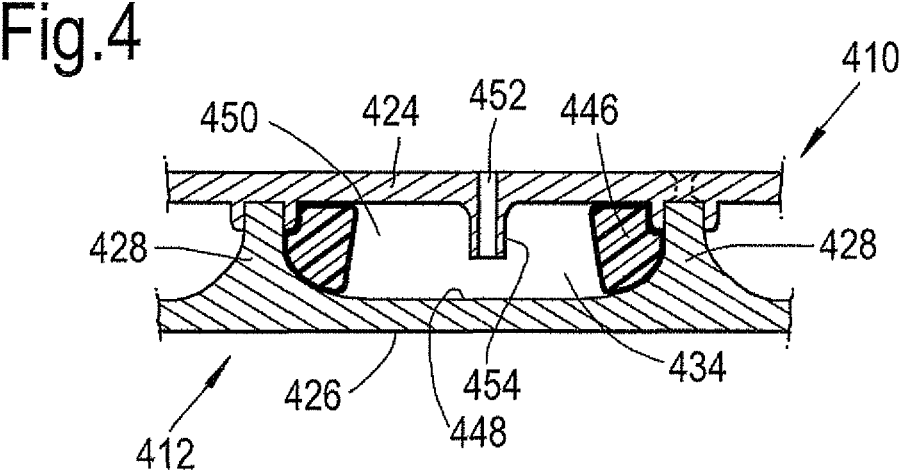

FIG. 4 shows a partial cross section of an OGV according to the present invention.

Figure 5A:
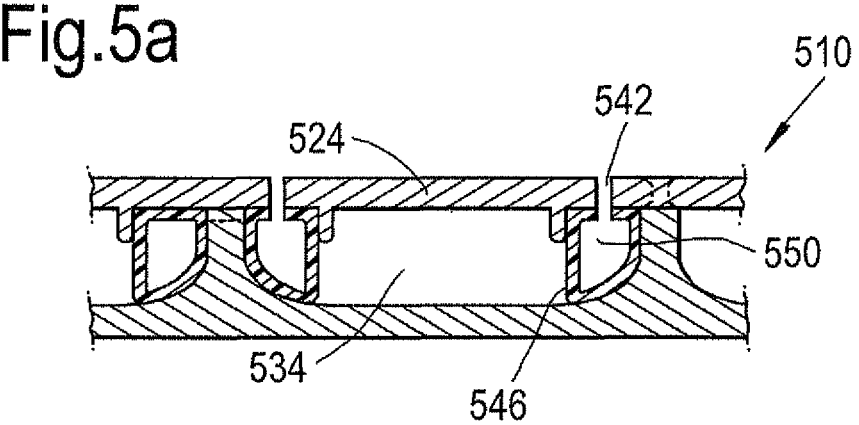
Figure 5B:
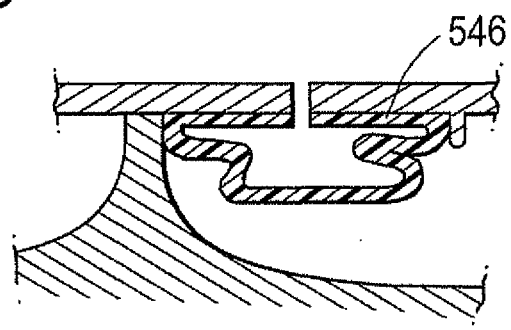

FIGS. 5a and 5b show an alternative embodiment the present invention.

Figure 6:
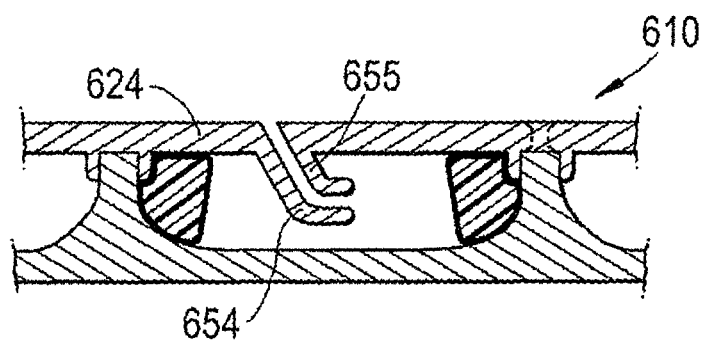
Figure 7:
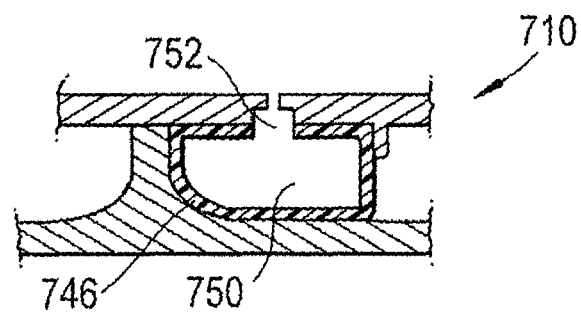

FIGS. 6 and 7 show alternative configurations for tuning the Helmholtz cavity.

Figure 1:
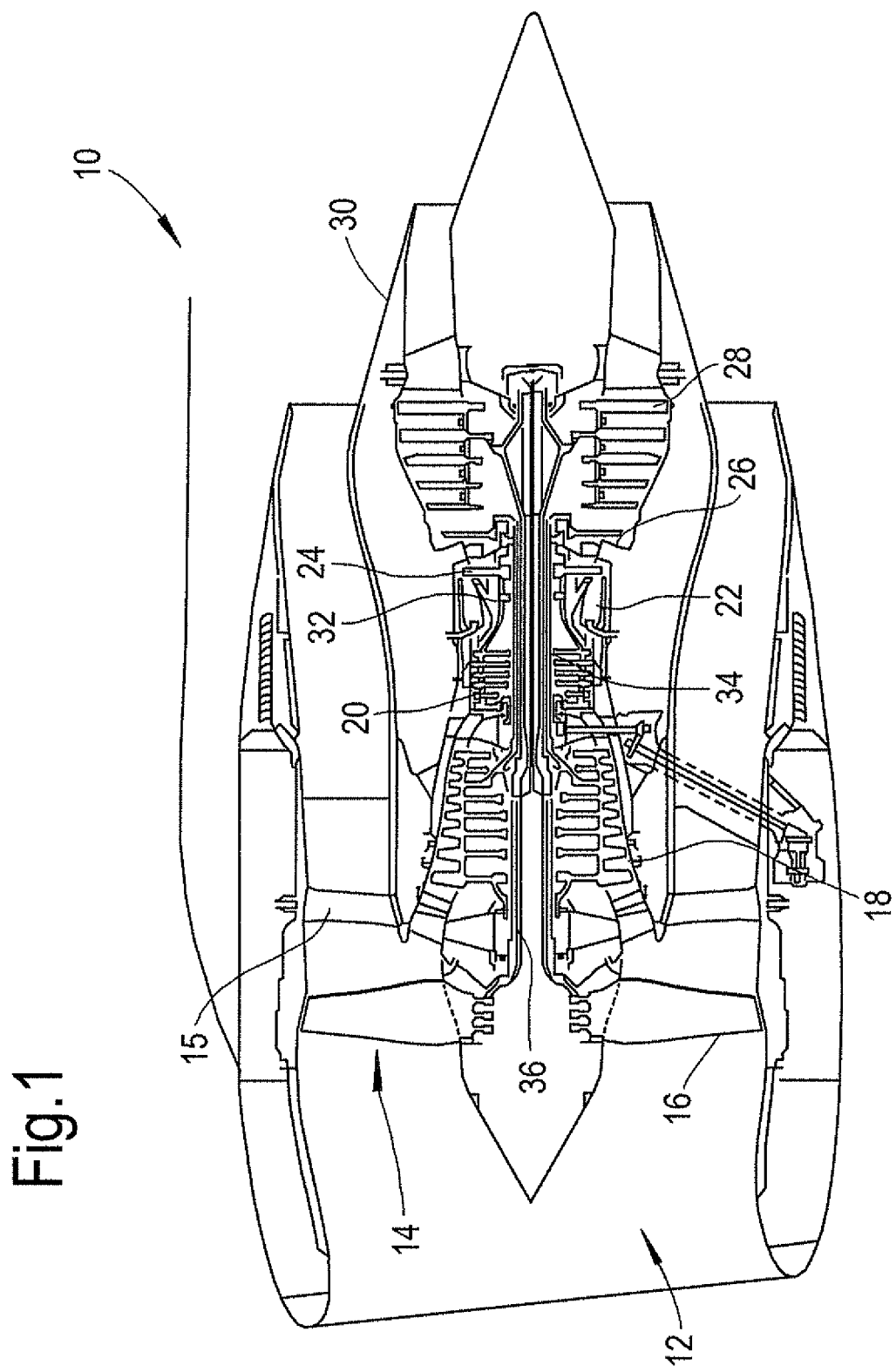
FIG. 1 shows a cross section of a typical three shaft gas turbine engine.

FIG. 1 shows a typical three shaft gas turbine engine 10. The gas turbine includes an air intake 12, a fan 14 having rotating blades 16, and intermediate pressure compressor 18, a high pressure compressor 20, a combustor 22, a turbine arrangement comprising a high pressure turbine 24, and intermediate pressure turbine 26, a low pressure turbine 28 and an exhaust nozzle 30.

The gas turbine engine 10 operates in a conventional manner. Air entering the intake 12 is accelerated by the fan 14 and directed into two air flows. The first air flow passes into the engine core, and the second airflow bypasses the engine core to provide propulsive thrust. An annular array of outlet guide vanes 15 are placed downstream of the fan to help turn and smooth the airflow in the bypass duct and increase the propulsive thrust produced by the engine.

The engine core air flow enters the intermediate 18 and high 20 pressure compressors in turn. The compressed air exhausted from the high pressure compressor 20 is mixed with fuel and burnt in the combustor 22. The hot gas expands through and drives the high 24, intermediate 26 and low 28 pressure turbines before being exhausted through the nozzle 30 and adding to the propulsive thrust created by the first airflow. The high 24, intermediate 26 and low 28 pressure turbines respectively drive the high 20 and intermediate 18 pressure compressors and the fan 14 via respective shafts 32, 34, 36.

It is common practice in a modern gas turbine engine to provide outlet guide vanes 15 to turn and smooth the airflow and increase the propulsive force produced by the fan 14. FIG. 2 shows a side view of an outlet guide vane (OGV) frame for an OGV which extends between the outer casing and inner ring downstream from the fan of the gas turbine engine.

The OGV frame 210 includes a body portion in the form of a peripheral wall 212 which extends around and bounds the edges of a hollow 214 within the OGV. The frame provides a suction surface 226, leading 216 and trailing 218 edges and first 220 and second 222 end portions which are used to secure the OGV to the outer casing and inner ring of the gas turbine engine.

The pressure surface 224 is made up from a portion of the peripheral wall 212 and a panel which is removed in FIG. 2 to reveal the internal structure of the OGV frame 210. The suction surface wall 226, of which only the inside surface can be seen in FIG. 2, is integrally formed with the peripheral wall 212 of the OGV frame 210 so as to provide a smooth gas washed surface.

A lattice of ribs 228 extend across the hollow 214 from the inside surface of the suction surface wall 226. Each rib 228 runs between diagonally opposing portions of the peripheral wall 212 so as to provide a lattice with intersections 230 along the longitudinal axis of the OGV. A further rib 232 extends from the first end 220 to the second end 222 along the longitudinal axis of the OGV so as to pass through the intersections 230 and form a plurality of internal chambers in the form of isolated triangular chambers 234.

The ribs 228, 232 which form the chambers may extend so as to meet the inside surface of the panel or such that the radial face of each rib forms part of the gas washed surface with each chamber being sealed with a single panel.

As will be appreciated, other arrangements of ribs are possible to provide walls for resonant chambers and to provide structural rigidity for the aerofoil. With these other arrangements, shapes other than triangular may be formed, and more than one shape may be present in any one embodiment. FIGS. 3a to 3c show various ways in which the pressure surface panel or (panels as the case may be) can be fixed to the OGV frame 210 to cover each internal chamber 234 and to prevent it being removed during normal service. It should be noted that although the panel is referred to as a pressure surface panel, it may be possible to place the panel on the suction surface. However, placement on the pressure surface is advantageous as the pressure of the gas flow in use helps retain the panel in place and the impact on performance for having an uneven surface is less critical for the pressure surface.

FIG. 3a shows a cross section of the OGV frame 310a having an attached panel 311a. The frame 310a of the embodiment is forged or machined from titanium so as to provide the suction surface wall 326a and rib 328a which partially define an internal chamber 334a on either side. However, the skilled person will appreciate that different materials and fabrication methods may be used.

The rib 328a includes a threaded bore 336 which receives a corresponding countersunk bolt 338, the head of which secures the panel to the body portion of the OGV frame 310a. The skilled person will appreciate that the number and distribution of the bolts 338 will depend upon the dimensions of the constituent components and the specified operating parameters. The bolts 338 may be made from any suitable material as known in the art such as fibre reinforced plastic or Titanium.

FIG. 3b shows a cross section of the OGV frame 310b and rib 328b with corresponding numerals to the embodiment of FIG. 3a. In this embodiment the panel includes protrusions 340 which extend perpendicularly from its inner surface 342. The protrusions 340 define a channel 344 which is sized to snugly receive the rib 328b thereby offering some lateral resistance to keep the panel 311b in place and an increased sealing surface between the two components so as to better isolate multiple chambers from each other.

It will be appreciated that the channel defining protrusions 340 may be used in conjunction with the bolts described in FIG. 3a.

Protrusions 340 may include features (not shown) to interlock with similar inverse features on the rib 328. These features may include but are not limited to a ridge and groove, or peg and indent. Alternatively or additionally, an adhesive may be used to both improve the sealing and help secure the panel on the rib.

FIG. 3c shows a cross section of an OGV frame 310c having corresponding features and numerals as the embodiment in FIG. 3a. The rib 328c in this embodiment includes re-entrant features 342 on either side in which the edge of the panels 311c are located so as to be trapped in situ. A suitable panel material in this embodiment would be an injection moulded thermoplastic (such as a is chopped fibre reinforced Stanyl™) which can be welded into the re-entrant features during manufacture. This is possibly a more labour intensive construction technique but provides a good seal around the perimeter of each chamber and also provides a good mechanical attachment and a smooth gas washed surface. Further, these features are relatively simply to form.

FIG. 4 shows a partial cross section of an OGV 410 according to the present invention. The OGV 410 includes a body portion in the form of an OGV frame 412 similar to the one described above, a panel 424 and an elastomeric component 446. The OGV frame 412 includes a suction surface wall 426 and a plurality of ribs 428. The portion of the pressure surface shown in FIG. 4 is provided by a panel 424.

The elastomeric component is in the form of an elastomeric ring 446 which is located around the periphery of the chamber 434 and is sandwiched between the panel 424, the inner surface 448 of the suction surface wall 426 and the respective rib 428. The elastomeric ring 446 acts to dampen vibrations which occur in the OGV during normal use. The skilled person will appreciate that the size, shape and material of the elastomeric ring 446 may be altered to damp a specific range of frequencies as required by a particular application. A suitable material for the elastomeric ring is a fluorocarbon or flourosilicon elastomer, which can be loaded with clay or carbon for damping or hollow spheres for weight reduction.

The elastomeric component damps the movement of the OGV body via the ribs but also the movement of the panel. To assist this, a thermoplastic elastomer can be chosen (such as the thermoplastic vulcanizates TPE-v or TPV) which will allow the elastomer to be bonded or partially bonded to the thermoplastic panel, or co-moulded when the panel is manufactured.

The elastomeric ring 446 bounds and partially defines a cell 450 within the internal chamber 434. The cell 450 is in fluid communication with the exterior of the OGV via an aperture 452 provided through a projection which is moulded on the interior surface of the panel 424 so as to form a tube 454. More specifically, the tube 454 has a central aperture 452 which passes from the interior of the cell 434 along a longitudinal axis of the tube 454 to the exterior surface of the panel 424 and OGV.

The purpose of the tube 454, aperture 452 and cell 434 can be configured to provide a Helmholtz acoustic resonator. As is well known in the art, the dimensions of the cell, tube and aperture can be altered to determine the acoustic properties of the Helmholtz cell. For example, the length of the tube may be varied from internal chamber to internal chamber in a given OGV to account for the differences in chamber volume. Differences in chamber volume may arise due to the placement of the ribs for structural considerations, or simply due to the curvature of the pressure and suction surfaces.

In one embodiment, the tube may have a diameter of approximately 1.5 mm and a length of approximately 3.2 mm. In another embodiment, the panel may not include a tube.

Although the primary purpose of the aperture in this embodiment is to provide a Helmholtz resonator, the position of the aperture relative to the longitudinal axis of the OGV may be varied according to the response required from the resonant cell cavity. However, in an alternative embodiment, the aperture (or apertures as the case may be), may be placed in a location which is favourable for drainage of the internal chamber. Thus, the apertures may be placed at the lowest possible point of the internal chamber with respect to vertical when in normal use. It is also possible to put the aperture in the OGV frame.

FIGS. 5a and 5b show a further embodiment in which at least one internal chamber 534 of the OGV 510 includes a dampening member in the form of a hollow elastomeric ring 546. The hollow void within the elastomeric ring 546 forms the cell 550 and is in fluid communication with the exterior of the OGV 510 via an aperture 542 which passes through the elastomeric ring 546 and corresponding portion of the panel 524. The interior wall of the elastomeric ring 546 forms a sealed cell within the internal chamber which is sealed relative to the exterior of the OGV 510.

Due to the resiliently deformable properties of the elastomer, the cell 550 is compressible. Hence, when the internal chamber 534 and sealed cell experiences a pressure differential relative to the exterior of the OGV 510 in service, the elastomeric ring 546 can be laterally displaced so as to reduce the size of the cell 550, as shown in FIG. 5b. In this way, the elastomeric ring 546 provides a pressure baffle which reduces the outward pressure applied to the panel 524 in service.

In a further embodiment, the size of the cell and the resilience of the elastomeric component are calculated to allow for the cell to be reduced to an extent where any water within the cell is squeezed out at a given altitude, for example, prior to it freezing.

As with the previous embodiment, the cell can be configured to act as a Helmholtz resonator for noise cancelation purposes. As will be appreciated, the performance of the resonator will be geometry dependant. It also allows the resonant frequency of the Helmholtz cell to be altered during a flight cycle such that different noise frequencies can be attenuated. In one embodiment, the larger cavity shown in FIG. 5a damps blade passing frequency and the smaller higher altitude cavity shown in FIG. 5b damps the higher frequency vane cavity resonance to reduce HCF (high cycle fatigue) effects. As will be appreciated by the skilled person, the geometry of the Helmholtz aperture will determine its resonant frequency.

FIG. 6 shows an OGV 610 having tube 654 extending from the inner surface of the panel 624 as with the embodiment of FIG. 4. However, in this modified version, the tube 654 extends from the interior of the panel 624 at an angle. The tube 654 includes a bent portion 655 along its longitudinal axis so that it can be co-moulded with the panel to lie alongside the inner surface of the lid. As shown, the inlet hole can be angled to deter the ingress of foreign matter. The tube 654 also allows lower frequencies such as flutter to be damped in this configuration.

FIG. 7 shows yet a further variation in which the OGV 710 includes an aperture 752 which connects the cell 750 to the exterior of the OGV 710 includes two portions along its longitudinal axis, each portion having different diameters so as to provide a profile. This allows a larger tolerance for the location of the hollow elastomeric ring 746 in which the neck is precision drilled to define the minimum aperture diameter and hence the properties of the resonator.

The panel can be any suitable polymer or composite. However, a thermosetting plastic is particularly advantageous as it allows the surface features to be moulded onto the surface of the panel. Hence, the tube, channel forming protrusions and re-entrant features can all be manufactured with ease.

As will be appreciated by the skilled person, the ribs can be tailored to meet strength, vibration, or acoustic requirements of the blade. Hence, a particular distribution of the cells can be implemented to accommodate Helmholtz cells for given frequency modes which occur in the OGV and or to account for the varying thickness of the OGV whilst providing a lightweight and resilient structure.

It will be appreciated that some of the embodiments described above may be combined in a single device. For example, the OGV may include a plurality of cells, both internal to the elastomeric component and external to it and a tube extending from the panel.

Although the embodiments describe an OGV, it will be appreciated that the invention is not limited to OGV's.

The invention claimed is:

1. A stator aerofoil for a gas turbine engine, comprising:
    a body portion;
    at least one panel which forms at least part of one of either a pressure or suction surface of the aerofoil;
    at least one internal chamber which is bounded by the body portion and panel;
    at least one elastomeric component within the at least one internal chamber;
    at least one cell bounded by walls of the elastomeric component; and
    a conduit passing through the body portion or the panel and connecting the cell with an exterior of the aerofoil,
    wherein the cell is arranged in fluid communication with the exterior of the aerofoil and is configured to operate as a Helmholtz resonator.

2. An aerofoil as claimed in claim 1, further comprising a plurality of cells within the internal chamber.

3. An aerofoil as claimed in claim 1, wherein the at least one cell is formed within the elastomeric component.

4. An aerofoil as claimed in claim 1, wherein the elastomeric component abuts the panel and body portion.

5. An aerofoil as claimed in claim 1 wherein an external wall of the elastomeric component defines a sealed cell within the internal chamber, wherein the sealed cell is sealed relative to the exterior of the aerofoil, and the elastomeric component is resiliently deflectable so as to act as a pressure baffle to account for a pressure differential between the sealed cell and the exterior of the aerofoil.

6. An aerofoil as claimed in claim 1 wherein the conduit passes through the panel.

7. An aerofoil as claimed in claim 6 wherein the conduit passes through a tubular portion which extends from an inside surface of the panel.

8. An aerofoil as claimed in claims 7 wherein the tubular portion extends at an angle to a local normal of the inside surface of the panel.

9. An aerofoil as claimed in claim 1 wherein the conduit passing through the panel has multiple diameters.

10. An aerofoil as claimed in claim 1 wherein the conduit is positioned towards a lower portion of the internal chamber when in normal use so as to provide a drainage hole for the internal chamber.

11. An aerofoil as claimed in claim 1 wherein the elastomeric component is located around a periphery of the internal chamber.

12. An aerofoil as claimed in claim 1 wherein the body portion includes a plurality of ribs which define a plurality of internal chambers within the body portion.

13. An aerofoil as claimed in claim 12 wherein the panel extends across multiple ribs to define multiple chambers.

14. An aerofoil as claimed in claim 1 wherein an edge of the panel is located within a re-entrant feature of the body portion.

* * * * *